(12) United States Patent
Lee et al.

(10) Patent No.: US 7,968,223 B2
(45) Date of Patent: Jun. 28, 2011

(54) SECONDARY BATTERY MODULE

(75) Inventors: Gun-Goo Lee, Suwon-si (KR); Tae-Yong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1237 days.

(21) Appl. No.: 11/357,321

(22) Filed: Feb. 17, 2006

(65) Prior Publication Data

US 2006/0216582 A1   Sep. 28, 2006

(30) Foreign Application Priority Data

Mar. 25, 2005  (KR) .................. 10-2005-0024870

(51) Int. Cl.
*H01M 10/50*  (2006.01)
*H01M 6/42*  (2006.01)

(52) U.S. Cl. .................... 429/120; 429/149

(58) Field of Classification Search ............. 429/71, 429/120

See application file for complete search history.

(56) References Cited

U.S. PATENT DOCUMENTS

| | | | |
|---|---|---|---|
| 5,756,227 A * | 5/1998 | Suzuki et al. | 429/62 |
| 6,340,877 B1 * | 1/2002 | Mita et al. | 320/112 |
| 6,692,864 B1 | 2/2004 | Dansui et al. | |
| 2003/0211384 A1 * | 11/2003 | Hamada et al. | 429/120 |
| 2003/0227749 A1 * | 12/2003 | Li | 361/697 |
| 2004/0023087 A1 * | 2/2004 | Redmond | 429/19 |
| 2006/0172187 A1 * | 8/2006 | Ambrosio et al. | 429/120 |

FOREIGN PATENT DOCUMENTS

| | | |
|---|---|---|
| CN | 1169601 A | 1/1998 |
| CN | 1317161 A | 10/2001 |
| CN | 2629225 Y | 7/2004 |
| JP | 08-148189 A | 6/1996 |
| JP | 09-120847 A | 5/1997 |
| JP | 2001-243993 A | 9/2001 |
| JP | 2001-297741 A | 10/2001 |
| JP | 2002-134177 A | 5/2002 |
| JP | 2003-297303 | 10/2003 |
| JP | 2005-26219 A | 1/2005 |
| WO | WO 89/10011 | 10/1989 |

OTHER PUBLICATIONS

Patent Abstracts of Japan, Publication No. 2005-026219, dated Jan. 27, 2005, in the name of Naoki Kimsura et al.

* cited by examiner

*Primary Examiner* — Patrick Ryan
*Assistant Examiner* — Muhammad Siddiquee
(74) *Attorney, Agent, or Firm* — Christie, Parker & Hale, LLP

(57) ABSTRACT

A secondary battery module includes a plurality of unit batteries, a housing receiving the unit batteries, a cell barrier plate disposed between the unit batteries to transfer heat generated from the unit batteries, a cooling plate disposed in contact with an end of the cell barrier plate, and a heat dissipation assembly disposed proximate to the cooling plate to dissipate heat transferred to the cooling plate.

21 Claims, 5 Drawing Sheets

SECONDARY BATTERY MODULE

CROSS REFERENCE TO RELATED APPLICATION

This application claims priority to and the benefit of Korean Patent Application No. 10-2005-0024870, filed on Mar. 25, 2005, the entire content of which is incorporated herein by reference.

BACKGROUND OF THE INVENTION (a) Field of the Invention

The present invention relates to a secondary battery, and more particularly, to a cooling structure for a secondary battery module having a plurality of unit batteries.

(b) Description of the Related Art

Unlike the primary battery, the secondary battery may be recharged. Lower power secondary batteries comprised of one battery cell are used as the power source for various portable electronic devices such as cellular phones, laptop computers, and camcorders. Bulk size secondary batteries in which a plurality of the battery cells are connected in a pack shape are used as the power source for motor drives, such as those in hybrid electric vehicles.

Depending on the external shape, secondary batteries may be classified into different types, for example, square and cylindrical batteries.

When the secondary batteries are used for motor drives of machines requiring a high power source, such as electric vehicles, the secondary batteries are serially connected to form a battery module.

A battery module is formed by serially connecting a plurality of secondary batteries (hereinafter "unit batteries").

Each unit battery includes an electrode assembly in which a separator is interposed between a positive electrode and a negative electrode, a container having a space receiving the electrode assembly inside thereof, a cap assembly assembled with the container to seal the container, and a positive terminal and a negative terminal protruded toward the cap assembly and electrically connected to a collector of a positive electrode and a negative electrode of the electrode assembly.

In addition, the unit batteries are spaced apart from each other and the terminals are connected to each other serially or in parallel to form a battery module.

Since the battery module connects several to tens of unit batteries, there is a need to efficiently emit heat generated from each unit battery. In particular, when the secondary battery is used for hybrid electric vehicles, the heat emission is of significant importance.

If the heat emission does not occur properly, a temperature difference between unit batteries results, which lowers charge-discharge efficiency.

In addition, the heat generated from each unit battery may excessively increase the temperature of the secondary battery module, which may cause the unit battery to explode.

In particular, since the battery module for hybrid electric vehicles used for motor drives requires high current charge and discharge, the internal reaction of the secondary battery generates heat, which may lower the performance of the battery.

SUMMARY OF THE INVENTION

Various embodiments of the invention provide a secondary battery module which can enhance cooling efficiency. In some embodiments, a secondary battery module is provided in which each unit battery forming the secondary battery module can be uniformly cooled.

According to one aspect of the present invention, a secondary battery module comprises a plurality of unit batteries, a cell barrier plate disposed between the unit batteries to transfer heat generated from the unit batteries, a cooling plate disposed in contact with an end of the cell barrier plate, and a heat dissipation assembly disposed proximate to the cooling plate to dissipate heat from the cooling plate.

The cooling plate may have a heat dissipation rib. The cell barrier plate may extend beyond the unit batteries in at least one direction. The heat dissipation assembly may have at least one cooling fan to move air toward the cooling plate. The heat dissipation assembly may include at least one thermoelectric element disposed on the cooling plate. The cooling plate may be disposed to face a side surface of the unit batteries. Two cooling plates may be disposed in contact two side surfaces of the unit batteries.

In other embodiments of the invention, the cell barrier plate may be made of material with high thermal conductivity such as copper or aluminum. The cooling plate may be made of material with high thermal conductivity such as copper or aluminum. Further, the unit batteries may be square shape batteries. The cell barrier plate may be integrally formed with the cooling plate or may be fixed to the cooling plate by welding.

The heat dissipation assembly may include a heat dissipation assembly housing supported on an outer end of the heat dissipation rib, a fan disposed inside the heat dissipation assembly housing to move air toward the heat dissipation rib, and a motor disposed inside the heat dissipation assembly housing and coupled to the fan.

According to another aspect of the present invention, a secondary battery module comprises a plurality of unit batteries, a housing receiving the unit batteries, a cell barrier plate disposed between the unit batteries to transfer heat generated from the unit batteries, and a cooling plate disposed in contact with an end of the cell barrier plate, wherein the housing has an inlet for allowing a flow of a heat transfer medium and a cooling fan is disposed in the inlet. The housing can also have two inlets and two cooling fans. In one embodiment, the housing also includes an exhaust outlet for exhausting the heat transfer medium from the housing.

The secondary battery module can be adapted to drive a motor, and used as the power source for motor driving devices, such as the hybrid electric vehicles, electric vehicles, wireless vacuum cleaners, motorbikes, or motor scooters.

BRIEF DESCRIPTION OF THE DRAWINGS

These and/or other aspects and features of embodiments of the invention will become apparent and more readily appreciated from the following description of the embodiments, taken in conjunction with the accompanying drawings of which.

DETAILED DESCRIPTION

Reference will now be made in detail to embodiments of the present invention, examples of which are illustrated in the accompanying drawings. The embodiments are described below to explain the present invention by referring to the figures.

The battery module in the following description uses air as a cooling medium, but the invention is not limited thereto. For example, cooling water or other fluids may be used as a cooling medium.

Figure 1:
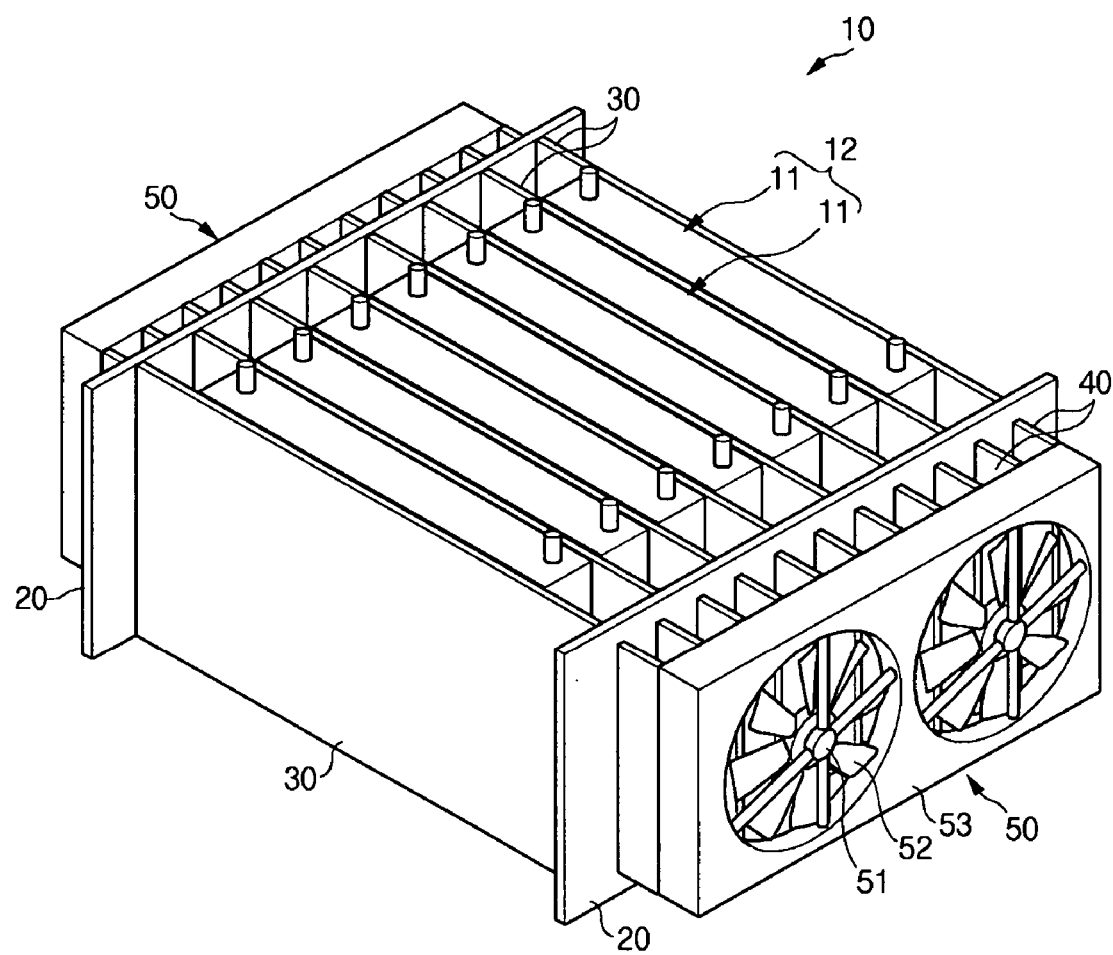
FIG. 1 is a schematic perspective view of a secondary battery module according to a first embodiment of the present invention.

FIG. 1 is a schematic perspective view of a secondary battery module according to a first embodiment of the present invention.

Referring to the drawing, the battery module 10 includes: a plurality of unit batteries 11, each unit battery having an electrode assembly to generate electric power, in which a separator is interposed between a positive electrode and a negative electrode; cell barrier plates 30 disposed in contact with the unit batteries 11 to transfer heat generated from the unit batteries 11; cooling plates 20 disposed in contact with a side end of the cell barrier plates 30; heat dissipation ribs 40 disposed in the outer surface of each cooling plate 20 and spaced apart from each other; and cooling fans 50 for pulling in cooling air toward the heat dissipation ribs 40.

The cooling plates 20 have a plate structure with a predetermined thickness. Each cooling plate 20 is disposed in contact with one end of the cell barrier plates 30 and extends over both side ends of the plurality of unit batteries 11.

Figure 2:
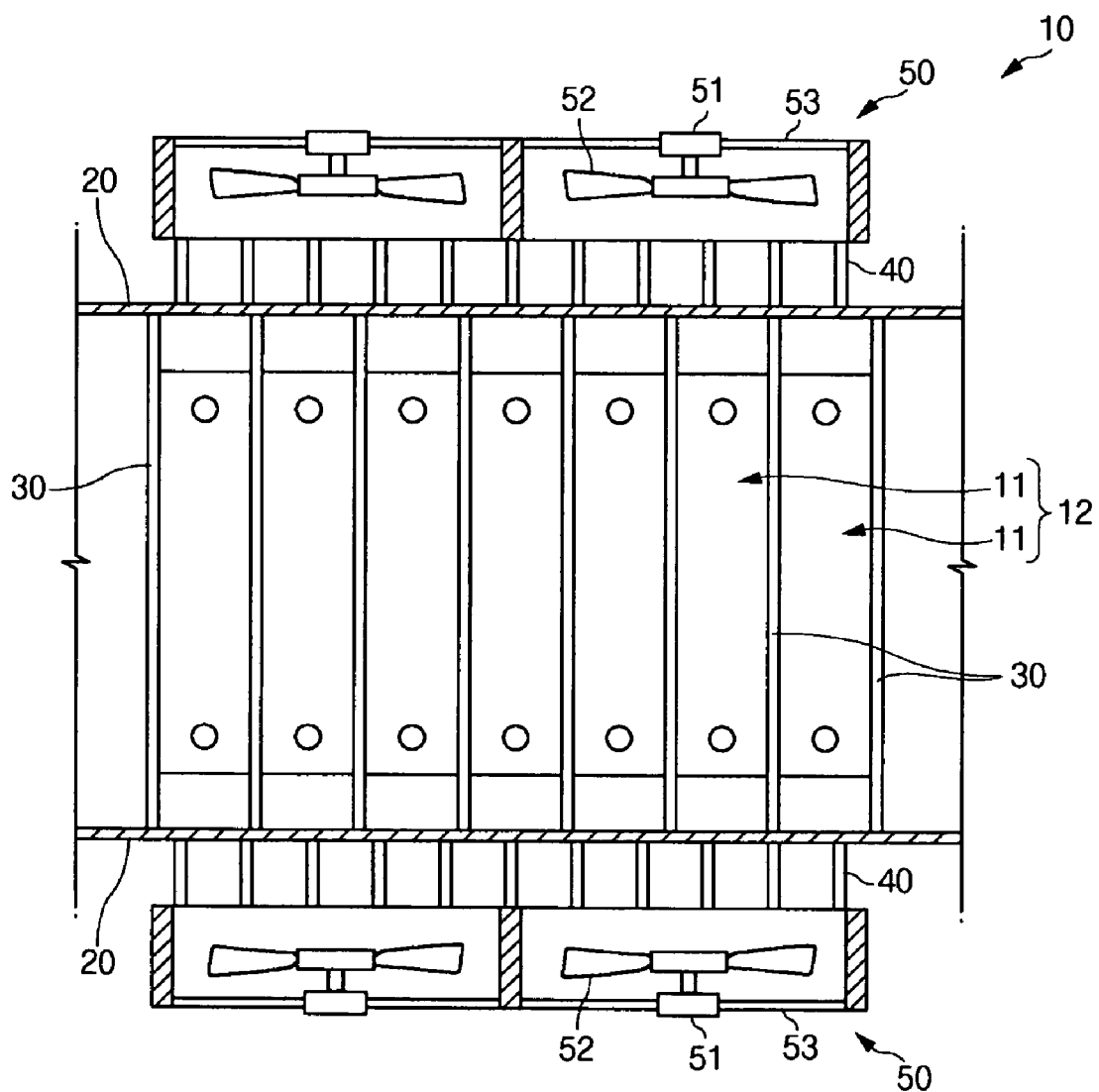
FIG. 2 is a partial side cross-sectional view of the secondary battery module according to the first embodiment of the present invention.

Referring now to FIG. 2, the cell barrier plate 30 according to the present embodiment is a thin plate made of material with high thermal conductivity, such as copper or aluminum, which is disposed between neighboring unit batteries 11 and having two of its surfaces in close contact with each neighboring unit battery 11.

In addition, both side ends of each cell barrier plate 30 extend beyond the ends of each unit battery 11. However, the present invention is not limited to this embodiment. For example, the cell barrier plate may have the same width as that of the unit battery 11.

The cooling plates 20 are disposed in contact with both ends of the cell barrier plates 30. The cell barrier plate 30 in FIGS. 1 and 2 has a structure such that its both ends are fixed to the side surfaces of the cooling plates 20 by welding. However, the cell barrier plate 30 may alternatively be integrally formed with the cooling plates 20.

The cell barrier plate 30 acts not only to transfer heat generated from the unit batteries 11 by closely contacting with the unit batteries 11 but also to maintain the distance between the unit batteries 11 and to support the unit battery 11 by being fixed to the cooling plate 20.

Accordingly, heat generated from the unit batteries 11 is transferred to the cooling plate 20 through the cell barrier plate 30 disposed between the unit battery 11 and the unit battery 11, and it is dissipated by air pulled in toward the cooling plate 20 by the cooling fan 50.

The cell barrier plate 30 may be comprised of a heat pipe. The heat pipe has a structure to efficiently transfer heat, which is formed by exhausting air such that a vacuum state exists inside the heat pipe, adhering porous material to the wall, and then filling the interior with water, methanol, acetone, sodium, mercury, etc. Therefore, heat may be transferred as latent heat during evaporation and condensation according to a temperature change of the interior liquid.

As various heat pipes are well-known in the art, the detailed explanation thereof is omitted.

The structure of the heat dissipation ribs 40 and the cooling fans 50, to substantially dissipate heat of the cooling plates 20, will now be described.

As shown in FIG. 2, a plurality of the heat dissipation ribs 40 are disposed on the outer surface of the cooling plates 20 perpendicular to the cooling plates and spaced apart by a predetermined distance.

There is no limitation on the lengths of the heat dissipation ribs 40.

The cooling fans 50 are disposed at respective ends of the heat dissipation ribs 40 to move cooling air between the heat dissipation ribs 40.

The cooling fan 50 has a known structure to intake air, which has a motor 51 for generating driving force, a plurality of fan blades 52 disposed on the rotation axis of the motor 51, and a heat dissipation assembly housing 53 coupled to the heat dissipation ribs 40 to receive the motor 51 and the fan blades 52 inside thereof.

Two cooling fans 50 are shown in the present embodiment, but there is no limitation on the number of cooling fans 50. For example, one cooling fan 50 can also be used.

The following will describe the operation of the battery module according to the present embodiment. In the battery module 10, the cell barrier plate 30 disposed between the unit batteries 11 is disposed in contact with the cooling plate 20 to dissipate heat from the unit batteries 11 through the cell barrier plate 30 and the cooling plate 20.

The cooling plate 20 is disposed at a side end of the battery aggregate 12 comprised of the unit batteries 11, and cooling air is supplied to the cooling plate 20.

The cell barrier plate 30 disposed between the unit batteries 11 extends beyond the unit batteries 11 to be fixed to the side surface of the cooling plate 20.

If, while the unit battery 11 is disposed between the cooling plates 20, heat is generated from the unit battery 11, the generated heat is transferred to the cell barrier plate 30, and to the cooling plate 20 through the cell barrier plate 30.

Accordingly, the heat of the cooling plate 20 is decreased by the operation of the heat dissipation rib 40 and the cooling fan 50 disposed near the cooling plate 20.

That is, if the cooling fan 50 starts operation, the outside air is pulled in toward the cooling plate 20 through the heat dissipation rib 40 by the rotation of the fan blades 52. Accordingly, the heat transferred to the cooling plate 20 is dissipated by a fast air flow generated by the cooling fan 50, and, thereby, the temperature of the unit battery 11 is lowered.

The heat dissipation rib 40 is provided in plural numbers in the cooling plate 20 to maximize the heat dissipation area. In addition, the heat transferred to the cooling plate 20 is dispersed between the heat dissipation ribs 40 to be rapidly dissipated by cooling air passing between the heat dissipation ribs 40.

Each unit battery 11 uniformly contacts the cooling plate 20 through the cell barrier plate 30. Accordingly, each unit battery 11 can achieve heat exchange under the same conditions and, thereby, the heat of each unit battery 11 is uniformly dissipated. That is, since the heat dissipation condition is the same, each unit battery 11 is uniformly cooled.

Figure 3:
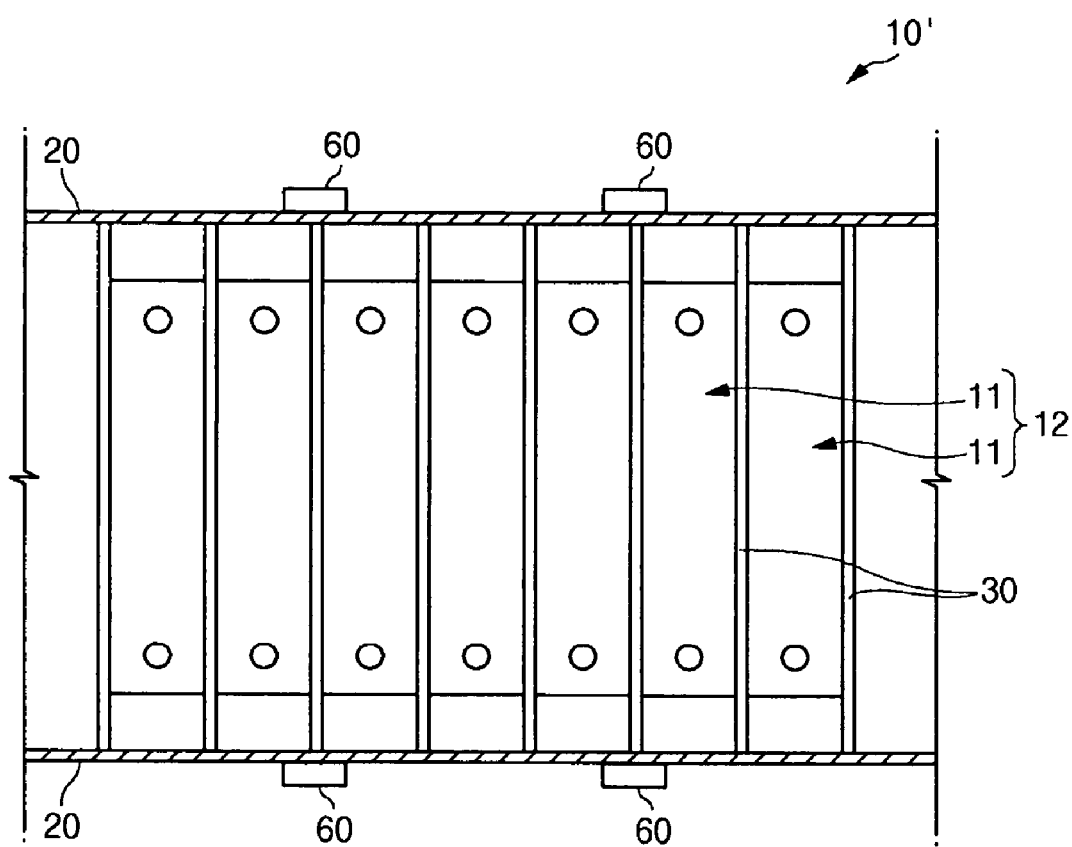
FIG. 3 is a partial side cross-sectional view of a secondary battery module according to a second embodiment of the present invention.

FIG. 3 is a partial cross-sectional view of a secondary battery module according to a second embodiment of the present invention, in which at least one thermoelectric element 60 is disposed on the outer surface of the cooling plate.

The thermoelectric element 60 is an element which performs exothermic reaction or endothermic reaction by use of hetero-metal or semiconductor, but is not limited to just these types.

For example, the thermoelectric element 60 can be an element which uses a cooling effect generated by combining bipolar semiconductors.

In order to exhaust the heat of the cooling plate 20, the thermoelectric elements 60 according to the present embodiment have a structure such that they can absorb the heat transferred to the cooling plate 20, and allows the heat to be transferred to the cooling air that passes the cooling plate 20.

The following will now describe in more detail how battery module 10' operates. As cooling air is forcefully supplied to the outside of the cooling plate 20 through a ventilator (not shown), the heat generated from the unit batteries 11 is transferred to the cooling plate 20 through the cell barrier plate 30, and is cooled by air passing by the cooling plate 20.

A temperature control electrode (not shown) of the thermoelectric element 60 is in contact with the cooling plate 20, and an endo/exothermic electrode (not shown) of the thermoelectric element is in contact with air passing by the cooling plate 20. When electric current flows in the thermoelectric element 60, the heat is transferred from the cooling plate 20 to the thermoelectric element 60, and the thermoelectric element 60 is cooled by air. Accordingly, the heat generated from the unit batteries 11 is efficiently exhausted.

Figure 4:
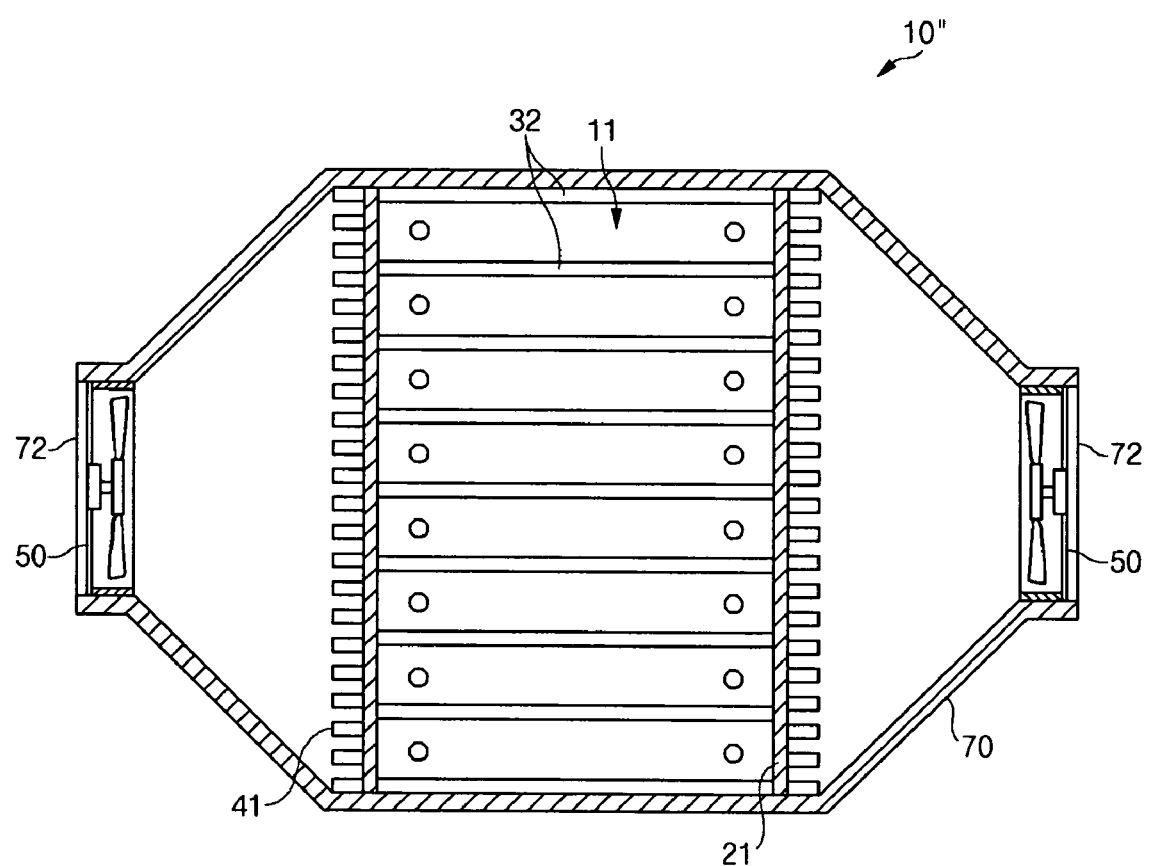
FIG. 4 is a partial side cross-sectional view of a secondary battery module according to a third embodiment of the present invention.

FIG. 4 is a cross-sectional view of a secondary battery module according to a third embodiment of the present invention. Referring to the drawing, the battery module 10" according to the present embodiment includes a housing 70 receiving the unit batteries 11.

In addition, the battery module 10" according to the present embodiment includes a plurality of unit batteries 11, cell barrier plates 32 disposed between neighboring unit batteries 11, and cooling plates 21 disposed in both ends of the cell barrier plates 32. The cooling plates 21 have a plurality of cooling ribs 41.

The cell barrier plates 32 have widths corresponding to the width of the unit batteries 11, and are disposed between neighboring unit batteries 11. Accordingly, the cooling plates 21 have a structure that is in contact with not only the cell barrier plates 32 but also the side surfaces of the unit batteries 11.

The housing 70 has an opened inlet 72 to allow cooling air to flow inside. The inlet 72 is disposed in the surface facing the cooling plate 21 to supply cooling air to the cooling ribs 41.

Figure 5:
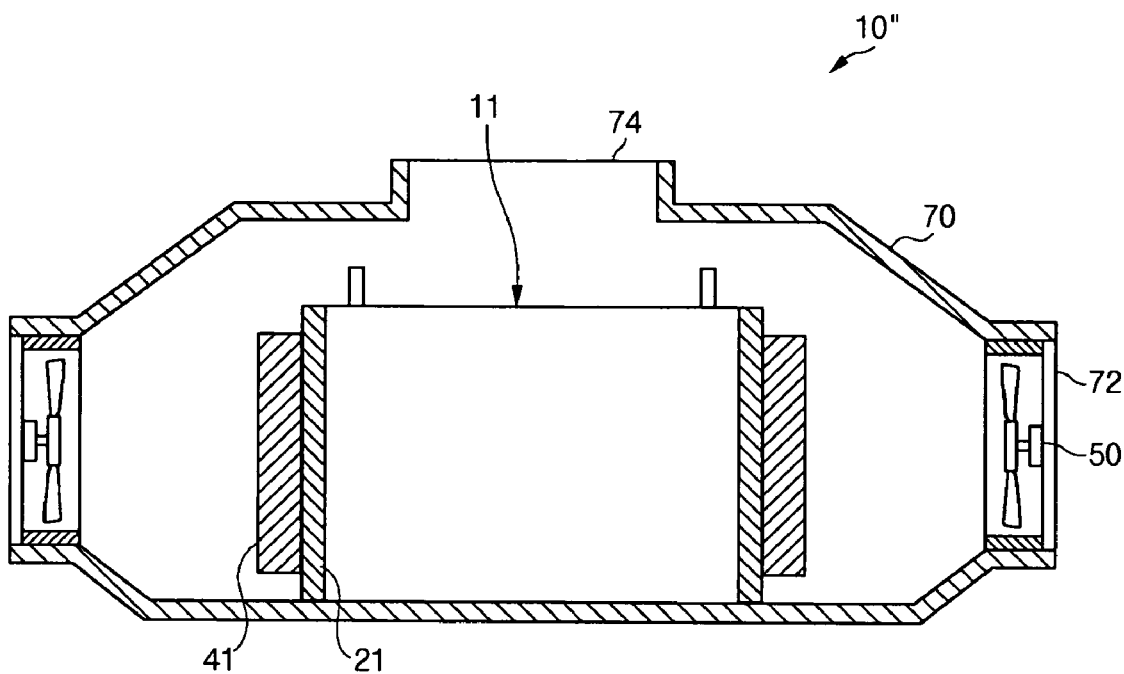
FIG. 5 is a partial longitudinal cross-sectional view of a secondary battery module according to a third embodiment of the present invention.

As shown in FIG. 5, the inlet 72 is formed at both sides of the housing 70, and air flowing in the housing 70 cools the cooling plate 21 and the cooling ribs 41, and is then exhausted outside through an outlet 74 formed in the housing 70.

Accordingly, the heat generated from the unit batteries 11 is transferred to the cooling plate 21 through the side surface of the unit battery 11 and the cell barrier plate 32. The cooling plate 21 is cooled by air flowing in the housing 70 to efficiently dissipate the heat generated from the unit batteries 11.

Figure 6:
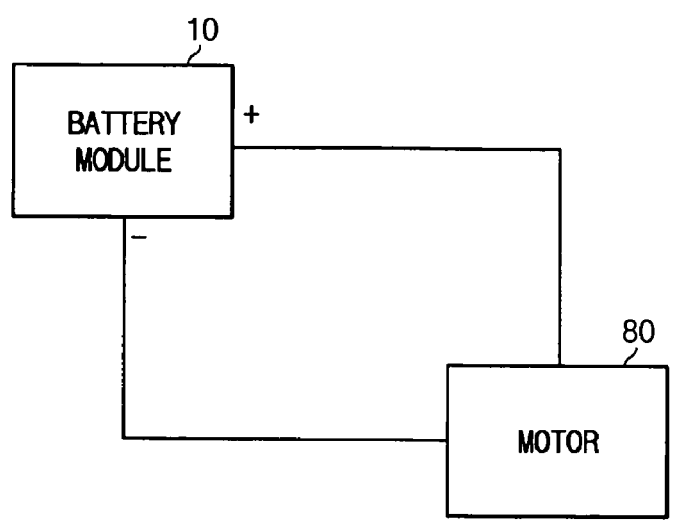
FIG. 6 is a block diagram schematically illustrating a motor drive by the secondary battery module according to an embodiment of the present invention.

FIG. 6 is a block diagram schematically illustrating a secondary battery module 10 according to an embodiment of the present invention adapted to drive a motor 80.

According to the above-described embodiments of the present invention, the cooling method of the battery module is improved to thereby efficiently cool the unit batteries.

In addition, the cooling medium can uniformly circulate between the unit batteries so that the partial heat imbalance over the whole battery module can be removed.

Embodiments of secondary battery modules according to the present invention can be used as the power source for motor driving devices, such as the hybrid electric vehicles, electric vehicles, wireless vacuum cleaners, motorbikes, or motor scooters.

Although a few embodiments of the present invention have been shown and described, it would be appreciated by those skilled in the art that modifications may be made to these embodiments without departing from the principles and spirit of the invention, the scope of which is defined in the claims and their equivalents.

What is claimed is:

1. A secondary battery module comprising:
a plurality of unit batteries spaced apart from one another in a first direction;
a cell barrier plate between the unit batteries to transfer heat generated from the unit batteries;
a cooling plate comprising a first surface in contact with an end of the cell barrier plate; and
a heat dissipation assembly disposed proximate to the cooling plate to dissipate heat from the cooling plate,
wherein the cell barrier plate extends beyond the unit batteries in at least one direction.

2. The secondary battery module of claim 1, wherein the heat dissipation assembly comprises at least one cooling fan configured to move air toward the cooling plate.

3. The secondary battery module of claim 1, wherein the heat dissipation assembly includes at least one thermoelectric element disposed on the cooling plate.

4. The secondary battery module of claim 1, wherein the cooling plate is disposed to face a side surface of the unit batteries.

5. The secondary battery module of claim 1, wherein the cooling plate is disposed in contact with a first end surface of the unit batteries, and wherein the secondary battery module further comprises a second cooling plate disposed in contact with a second end surface of the unit batteries.

6. The secondary battery module of claim 1, wherein the cell barrier plate comprises copper or aluminum.

7. The secondary battery module of claim 1, wherein the cooling plate comprises copper or aluminum.

8. The secondary battery module of claim 1, wherein the unit batteries are square shape batteries.

9. The secondary battery module of claim 1, wherein the cell barrier plate is integrally formed with the cooling plate.

10. The secondary battery module of claim 1, wherein the cell barrier plate is fixed to the cooling plate by welding.

11. The secondary battery module of claim 1, wherein the cooling plate further comprises a second surface opposite the first surface and a heat dissipation rib extending from the second surface.

12. The secondary battery module of claim 1, wherein the secondary battery module is adapted to drive a motor.

13. A secondary battery module comprising:
a plurality of unit batteries;
a cell barrier plate between the unit batteries to transfer heat generated from the unit batteries;
a first cooling plate in contact with a first end of the cell barrier plate;
a second cooling plate in contact with a second end of the cell barrier plate opposite the first end; and
a housing surrounding the unit batteries, the cell barrier plate, and the first and second cooling plates, wherein the housing has a first inlet open in a first direction toward the first cooling plate and a second inlet open in a second direction toward the second cooling plate and opposite the first direction for allowing a flow of a heat transfer medium and comprises a first cooling fan in the first inlet and a second cooling fan in the second inlet.

14. The secondary battery module of claim 13, wherein a cooling rib is disposed on the first cooling plate.

15. The secondary battery module of claim 14, wherein the cooling rib is disposed on a surface of the first cooling plate facing the inlet.

16. The secondary battery module of claim 13, wherein the first cooling plate is in contact with a first side surface of the unit batteries, and wherein the second cooling plate is in contact with a second side surface of the unit batteries opposite the first side surface.

17. The secondary battery module of claim 13, wherein the housing further comprises an exhaust outlet for exhausting the heat transfer medium from the housing.

18. The secondary battery module of claim 11, wherein the heat dissipation assembly comprises a heat dissipation assembly housing supported on an outer end of the heat dissipation rib, a fan inside the heat dissipation assembly housing and configured to move air toward the heat dissipation rib, and a motor inside the heat dissipation assembly housing and coupled to the fan.

19. The secondary battery module of claim 11, wherein the heat dissipation rib extends from the second surface of the cooling plate in a second direction substantially perpendicular to the first direction.

20. The secondary battery module of claim 11, wherein the heat dissipation rib comprises a plurality of heat dissipation ribs spaced apart from one another in the first direction.

21. The secondary battery module of claim 20, wherein the heat dissipation assembly comprises at least one cooling fan configured to move air between adjacent heat dissipation ribs of the plurality of heat dissipation ribs.

* * * * *

UNITED STATES PATENT AND TRADEMARK OFFICE
CERTIFICATE OF CORRECTION

| | | |
|---|---|---|
| PATENT NO. | : 7,968,223 B2 | Page 1 of 1 |
| APPLICATION NO. | : 11/357321 | |
| DATED | : June 28, 2011 | |
| INVENTOR(S) | : Gun-Goo Lee et al. | |

It is certified that error appears in the above-identified patent and that said Letters Patent is hereby corrected as shown below:

In the Claims

Column 7, Claim 15, line 11           Before "inlet"
                                      Insert -- first --

Signed and Sealed this
Twenty-ninth Day of May, 2012

David J. Kappos
*Director of the United States Patent and Trademark Office*